United States Patent
Bushore et al.

(10) Patent No.: US 9,965,479 B2
(45) Date of Patent: May 8, 2018

(54) SYSTEMS AND METHODS FOR RELINKING DATA ITEMS

(75) Inventors: Lance D. Bushore, Seattle, WA (US);
Michael Easter, Bellevue, WA (US);
Thomas M. McDonald, Bainbridge Island, WA (US)

(73) Assignee: Adobe Systems Incorporated, San Jose, CA (US)

( * ) Notice: Subject to any disclaimer, the term of this patent is extended or adjusted under 35 U.S.C. 154(b) by 843 days.

(21) Appl. No.: 12/233,382

(22) Filed: Sep. 18, 2008

(65) Prior Publication Data

US 2014/0032526 A1    Jan. 30, 2014

(51) Int. Cl.
*G06F 17/30* (2006.01)

(52) U.S. Cl.
CPC .............................. *G06F 17/30067* (2013.01)

(58) Field of Classification Search
None
See application file for complete search history.

(56) References Cited

U.S. PATENT DOCUMENTS

| | | | |
|---|---|---|---|
| 5,047,918 A | | 9/1991 | Schwartz et al. |
| 5,430,872 A | * | 7/1995 | Dahod et al. |
| 5,600,828 A | * | 2/1997 | Johnson et al. ............... 707/758 |
| 6,269,377 B1 | * | 7/2001 | Collie et al. |
| 6,321,242 B1 | * | 11/2001 | Fogg et al. .................... 715/236 |
| 6,578,078 B1 | * | 6/2003 | Smith et al. ................... 709/224 |
| 6,704,741 B1 | | 3/2004 | Lively, Jr. et al. |
| 6,836,806 B1 | * | 12/2004 | Raciborski et al. .......... 709/245 |
| 7,325,045 B1 | * | 1/2008 | Manber et al. ................ 709/219 |
| 7,536,683 B2 | * | 5/2009 | Zimmerman et al. ......... 717/162 |
| 7,689,667 B2 | * | 3/2010 | Lal ................................. 709/218 |
| 7,752,542 B2 | * | 7/2010 | Cragun et al. ................ 715/236 |
| 2002/0069282 A1 | * | 6/2002 | Reisman ........................ 709/227 |
| 2003/0158953 A1 | * | 8/2003 | Lal ........................... H04L 29/06 709/230 |
| 2003/0225829 A1 | * | 12/2003 | Pena ................... G06F 17/30899 709/203 |
| 2004/0177096 A1 | * | 9/2004 | Eyal et al. .................. 707/104.1 |
| 2005/0021997 A1 | * | 1/2005 | Beynon et al. ............... 713/200 |
| 2005/0071478 A1 | * | 3/2005 | Bates et al. ................... 709/228 |

(Continued)

OTHER PUBLICATIONS

"SAP R/3 Style Guide," Aug. 16, 2004, "Checkboxes and Radio Buttons" page. Available at: https://experience.sap.com/files/guidelines/MiniSG/index.htm.*

(Continued)

*Primary Examiner* — Charles D Adams
(74) *Attorney, Agent, or Firm* — Shook, Hardy & Bacon, L.L.P.

(57) ABSTRACT

In one example embodiment, a method is implemented to relink a data item. The method includes identifying that a data item, referenced by a referencing document, is absent from a data item location for the data item indicated by the referencing document. User preference data, indicating a designated relink location to search for absent data items, is accessed. The relink location is searched for the absent data items. Another example embodiment may include a method to relink a current data item to a replacement data item location by accessing user preference data and searching a relink location for a replacement data item in accordance with the relink location indicated by the user preference data.

19 Claims, 10 Drawing Sheets

(56) References Cited

U.S. PATENT DOCUMENTS

2008/0182509 A1\* 7/2008 Khedouri et al. ........... 455/3.06
2008/0195483 A1\* 8/2008 Moore ............................ 705/14
2008/0263193 A1\* 10/2008 Chalemin et al. ............ 709/224

OTHER PUBLICATIONS

"Multi-Ad Creator2 1.6.2 Updater Read Me", Multi-Ad Services, Inc., Welcome to Multi-Ad Creator2 1.6.2. This read Me document contains instructions for updating Creator2 1.5-1.6.1 to Creator2 1.6.2, as well as late breaking information not found in the printed documentation., (Apr. 7, 2000), 7 pgs.

\* cited by examiner

FIG. 2

| NAME | EXTENSION | LOCATION | MISSING |
|---|---|---|---|
| FILE1 | JPG | C:/MY COMPUTER/FILE1.JPG | YES |
| FILE2 | JPG | C:/MY COMPUTER/FILE2.JPG | YES |
| FILE3 | TIFF | C:/MY COMPUTER/FILE3.TIFF | YES |

FIG. 4

| | NAME | | | | |
|---|---|---|---|---|---|
| ☐ | FILE1.JPG | | | | |
| ☐ | FILE2.JPG | | | | |
| ☐ | FILE3.JPG | | | | |
| ☐ | FILE4.JPG | | | | |
| ☒ | FILE5.JPG | ? | | | |

1 SELECTED

FIG. 3

| | NAME | | | | |
|---|---|---|---|---|---|
| ☒ | FILE1.JPG | ? | | | |
| ☒ | FILE2.JPG | ? | | | |
| ☐ | FILE3.JPG | | | | |
| ☐ | FILE4.JPG | | | | |
| ☒ | FILE5.JPG | ? | | | |

3 SELECTED

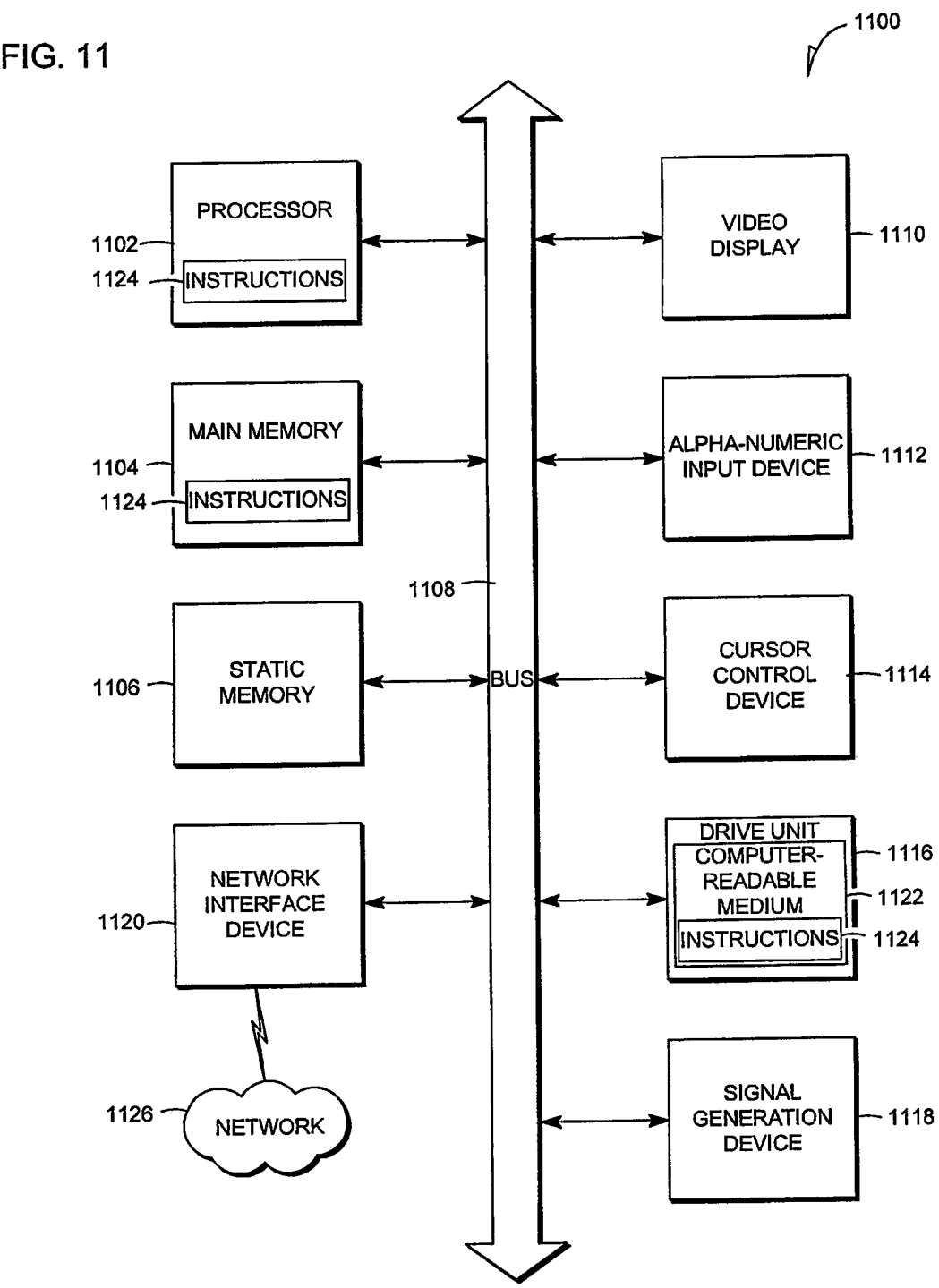

SYSTEMS AND METHODS FOR RELINKING DATA ITEMS

BACKGROUND

Applications being run on a computer or other machine may maintain a database of files that are associated with the application. In some instances, the files may be moved or deleted. In some cases, upon a file being moved or deleted the application may no longer be able to use the missing or deleted file. Similarly, a user of the application may wish to update the location of a file or replace a file with an updated copy.

BRIEF DESCRIPTION OF THE DRAWINGS

Some embodiments are illustrated by way of example and not limitation in the figures of the accompanying drawings in which:

FIG. 2 is a table representation of a data item library according to an example embodiment.

FIGS. 3-4 are user interfaces that may be used to relink a data item according to an example embodiment.

FIG. 11 shows a diagrammatic representation of a machine according to an example embodiment.

DETAILED DESCRIPTION

Figure 1:
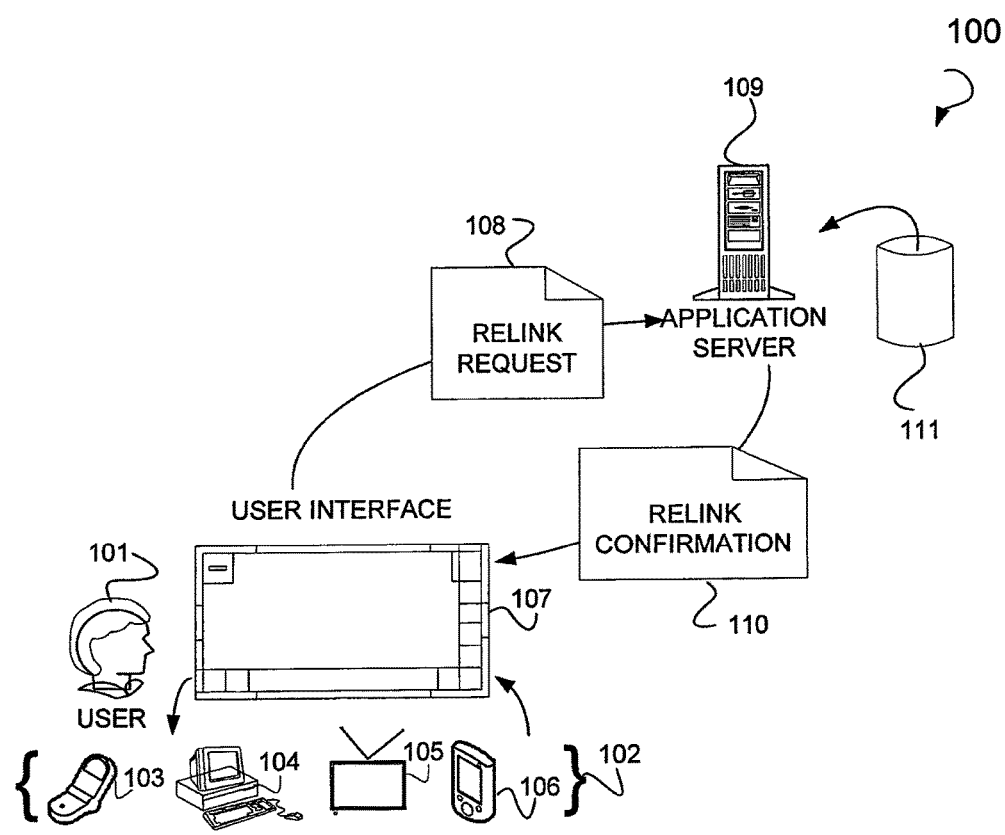
FIG. 1 is a diagram of a system for relinking data item according to an example embodiment.

An application, being run on a user's computer for example, may have many documents that are associated with the application. For example, a PDF document may be associated with the application Adobe Acrobat Reader. In that case, the PDF document may be opened by Adobe Acrobat Reader. In other examples, the document may reference other documents. For example, a document associated with a page layout application may maintain a data item library that manages the location of other documents. In an example, the document that has the data item library may be considered the referencing document. A location may refer to the path to a document on a user's computer. For example, a data item may have a location of "C:\My Computer\Example.jpg." The data item library may consist of one or more referenced data items a user wishes to use in the referencing document. In an example, a referenced data item may be thought of as any type of document the user may wish to use in the referencing document. For example, the data item library may contain an image data item the user is using for a banner of a newspaper layout. In some examples, the data item library may maintain a list of hundreds of data items. The data item library may also store a location for each of the files in the data item library. In some examples, the data items may be moved from their original locations.

In some examples, the application may notify a user that the application cannot find a referenced data item (a missing data item may be considered an absent data item). This may be because, for example, the data item has been moved. In other examples, the data may have been deleted. The data item library associated with the referencing document may maintain a list of absent data items by flagging each absent data item. In an example, the user may know where the data item has been moved. Therefore, the user may indicate to the application where the absent data item is located. Because the data item library may have many absent data items, the user may wish to locate many absent files at once. It is also possible in some examples that the reason a data item has been marked as absent is because the user has moved a folder of many referenced data items to a new location. Rather than having the user locate each absent data item, the user may prefer to search one location for any absent files. In an example, this location may be considered the relink location. In this manner, the user may only have to navigate to the relink folder location once, and the application may locate many absent data items. The application may then update the data item library for the referencing document by removing any flags for any found absent data items and updating their respective locations.

In further examples, a user may wish to replace or update referenced data items in the referencing document. For example, continuing the banner example, the user may have created a higher resolution version of the banner image. Rather than having to delete the old data item and import the new data item, the user may wish to tell the application the location of the updated banner image. In some examples, the user may wish to update the data item with a new file type. For example, the old banner image may have a filename of "banner." It may also have an extension of .jpg. The .jpg extension may indicate the image as being a Joint Photographic Experts Group (JPEG) file. Because the JPEG format may be considered a compressed image format, the user have another version of the image in an uncompressed format such as a Tagged Image File Format (TIFF). In an example, the user may tell the application to update the location of the banner image to point to the TIFF version of the file. In an example, the user may select multiple data items from the data item library and point to a folder location in which to find the updated data items. In an example, this folder location may be considered the relink location. The application may then search the relink location for updated versions of the selected data items.

FIG. 1 is a diagram of an example system 100 illustrating a system to relink a data item. Shown is a user 101 utilizing a user interface 107 that resides on any one of a number of user devices 102. These devices 102 may include, for example, a cell phone 103, a computer system 104, a television 105, and/or a Personal Digital Assistant (PDA) 106. The user 101 may generate a relink request 108. Request 108 may be, for example, a request to relink an absent data item that has been deleted. In an example embodiment, the relink request may be a request to relink a data item to a new version of the data item. In one example embodiment, the request 108 is sent to an application server 109. Once received by the application server 109, the relink request 108 may be parsed by the application server 109 and the application server 109 may attempt to perform the request 108. The application server 109 may be operatively coupled to a data item library 111 that may store the locations and status of data items. Upon the success or failure of the application server 109, a relink confirmation 110 may be sent to the user. In an example embodiment, the confirmation 110 may inform the user 101 that a data item was successfully relinked. In another example, the confirmation 110 may inform the user 101 that only some of the selected data items were relinked. In an example embodiment, a relinking module may be communicatively coupled to the application server 109. The relinking module may implement the receiving of the relink request and perform the relinking. It may also implement further example method such as those described in FIGS. F and I.

FIG. 2 illustrates an example data item library 111 stored in a table format. In an example embodiment, the application server 109 includes a data item library 111 for each referencing document. In example embodiments, the data item library may be structured as an Extensible Markup Language (XML) document or be stored as an object-relational database. Each entry in the data item library 111 may include one or more attributes describing the data item. The attributes may include, but are not limited to, a filename 202, an extension 204, a location 206, and an absent flag 208. Example entry 212 has a filename of "file1," a location of "C:/My Computer/file1.jpg," an extension of "jpg," and an indication the data item is missing. Other example entries 214 and 216 show further data items that may be associated with a referencing document.

FIG. 3 illustrates an example user interface 107 that a user may use to relink data items. The example interface 107 includes a set of data items 301 that includes five example data items 302, 304, 306, 308, and 310. Interface 107 also may include three columns. Column 312 indicates whether or not a data item has been selected. Column 314 illustrates the name of a data item. Column 316 illustrates whether or not a data item has been flagged as absent. 318 illustrates the number of data items 301 currently selected. In an example embodiment, the user interface 107 may reflect what is currently being stored in the data item library 111 for the referencing document. For example, data item 302 may correspond to entry 212 with reference to FIG. 2. As can be seen, the name of data item 302 is the same as the name in entry 202. Similarly, data item 302 has an indication in the absent column 316 that corresponds to the absent flag 210 column. A user may quickly look at interface 107 and determine what data items are considered absent in the underlying data item library. FIG. 3 illustrates that there are three items that are considered absent and those data items, 302, 304 and 310 have been selected.

FIG. 4 illustrates an example user interface 107 which displays information for a set of data items 401 including data items 402, 404, 406, 408, and 410. As can be seen in comparison to FIG. 3, only one example data item 410 has an indication that it has been flagged as absent. This may mean, for example, the user has successfully relinked some of the previously absent data items.

Relinking Absent Data Items

Figure 5:
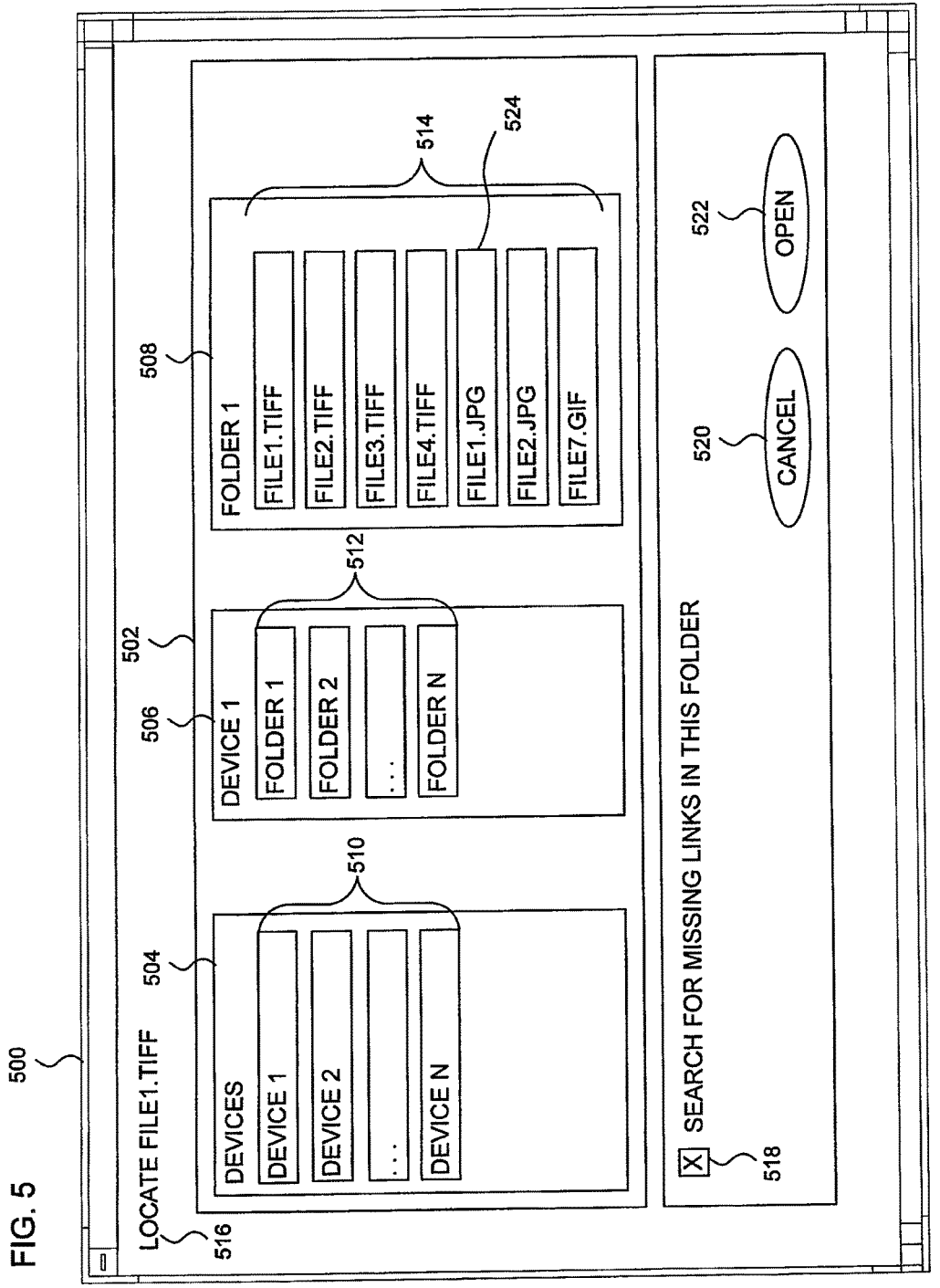
FIG. 5 illustrates an example user interface used to relink data items that have been marked as absent according to an example embodiment.

FIG. 5 illustrates an example user interface 500 that may be used to relink data items that have been marked as absent in a data item library associated with a referencing document. The interface 500 includes a navigation interface 502 which may include three panels 504, 506, and 508 that reflect devices, folders, and files respectively. In an example embodiment, the devices panel 504 may reflect example storage devices 510 accessible from the application server 109. The devices 510 may be either local or remote storage devices. For example, a local storage devices may include, but are not limited to, a hard drive or a Universal Serial Bus (USB) attached thumb drive. Remote devices may include, but are not limited to, a network attached storage (NAS) device, a File Transfer Protocol (FTP) Server, or a storage device located on the Internet. The folder panel 506 displays one or more example folders 512 on "device 1." The files panel display may display example files 514.

The user interface 500 may also include example instructions 516 for a user. In this example, the instructions 516 tell the user to locate "File1.tiff." The user interface 500 may further include a user preference box 518, a cancel control 520 and an open control 522. The user preference box 518 may indicate whether the user wishes to locate further missing (absent) files in a folder upon using the open control 522.

Figure 6:
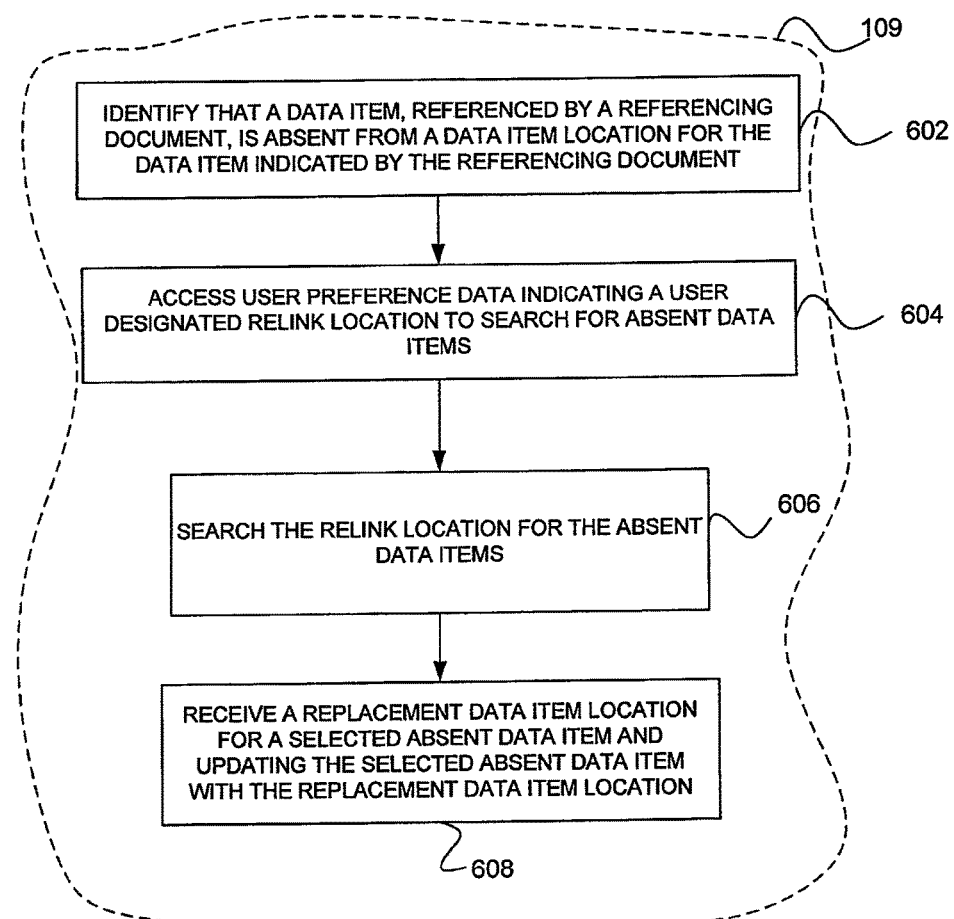
FIG. 6 illustrates an example flowchart to relink a data item that has been flagged as absent according to an example embodiment.

FIG. 6 illustrates an example flowchart 600 displaying example steps to relink a data item that has been flagged as absent. At block 602, in an example embodiment, a data item is identified, referenced by a referencing document, that is absent from a data item location for the data item indicated by the referencing document. In an example embodiment, absent data items may be determined based on a data item library for the referencing document, the data item library including a list of data items in the referencing document with one or more data items flagged as absent.

An application server (e.g., 109) may check periodically whether or not data items are absent from their recorded locations. For example, when a user accesses a document, the application server may access the data item library for the accessed document. The application may iterate through each entry in the data item library and retrieve the corresponding locations. For example, assume data item library 111 is currently associated with the accessed document. The application server may retrieve the location 206 for entry 212 and attempt to navigate to the location. If the data item is not present at the recorded location, the application server may flag the data item as absent. In further example embodiments, the application may continuously check to see which data items are absent from their recorded locations. In an example embodiment, the data item library is searched at predetermined intervals after the referencing document is accessed. In an example embodiment, the data item library is searched responsive to the referencing document being accessed. The user may see the status of data items (e.g., if they have been flagged as absent) in a user interface such as 107 with reference to FIG. 3.

At block 604, in an example embodiment, user preference data is accessed indicating a designated relink location to search for absent data items. In an example, the user may select a data item and indicate to the application server that he or she wishes to relink the data item. This may be done, for example, by selecting an example data item 302 in a user interface such as 107 and indicating (e.g., through a contextual menu) a preference to relink the data item. A user interface as described in FIG. 5 may then be presented to the user. The user may navigate to the location of the data item using a navigation panel such as 502 and select the data item which corresponds to the data item selected in user interface 107. The user may also activate the open control after the user has selected the data item in the navigation panel. If the user activates the open control, but the data item's filename selected in the navigation panel does not match the data item's filename selected in user interface 107, a notification may be presented to the user asking the user to select a new data item.

In an example embodiment, it is determined whether the user preference data indicates the user preference to search a relink location. The user preference data may indicate whether the user wishes to search for additional absent data items in the navigated to location. In an example, each referencing document has stored user preference data that indicates whether or not the user previously had selected the user preference box to search for additional absent data items. In an example embodiment, the user preference data is accessed by retrieving the user preference data from relinking preference data for the referencing document. This may allow the user interface to default to the last stored preference of the user. If the user changes the value of the user preference box (e.g., 518) the user preference data may be updated and stored. In an example embodiment, the relink location is the folder in which the data item selected in a navigation panel resides. For example, FIG. 5 illustrates that example data item 524 is located within "Folder 1." Thus, if example data item 524 was selected, the relink location may be "Folder 1."

At block 606, in an example embodiment, it is determined the user preference indicates the user preference to search a relink location and the relink location is searched for the absent data items. In an embodiment, the application server may iterate through each data item that been flagged as absent in the data item library associated with the referencing document. For each flagged data item, the application server may search the relink location. An example method of searching is described in further detail with reference to FIG. 7.

At block 608, in an example embodiment, a replacement data item location is received for a selected absent data item and the selected absent data item is updated with the replacement data item location. In an embodiment, regardless of whether or not the user indicated to search for additional absent items, the originally selected data item (e.g., the data item 302) will have its location updated in the data item library. For example, if data item 524 is selected the replacement data item location may be the location for data item 524. As illustrated in FIG. 5. the replacement data item location may be "Device 1/Folder 1/File1.jpg." The application server may edit the entry in the data item library for the "File1.jpg" entry to reflect its new location. The data item library may be further updated by unflagging the entry for "File1" indicating it was absent. This may be further reflected to the user by a notification in the form of a dialog box presented to the user or other suitable means. A user interface such as 107 with reference to FIG. 4 may also be updated to indicate "File1.jpg" is no longer considered absent.

Figure 7:
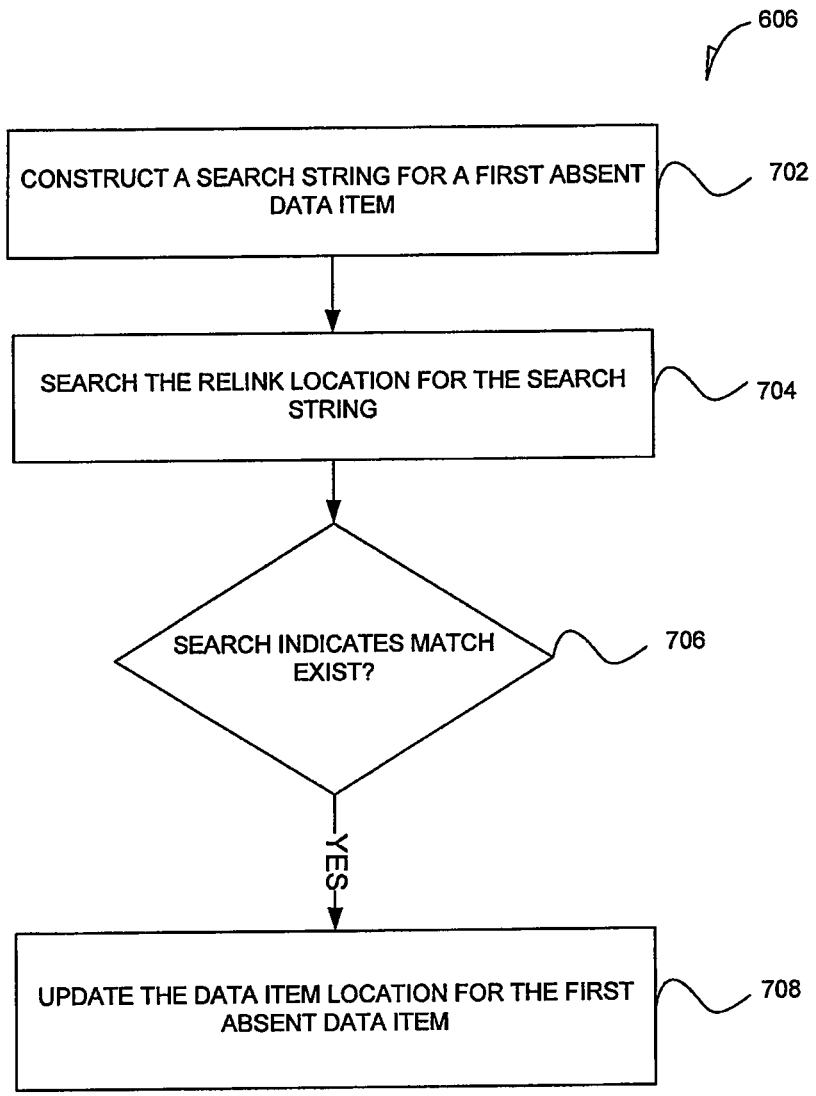
FIG. 7 illustrates an example flowchart to search a relink location for absent data items according to an example embodiment.

FIG. 7 illustrates a flowchart 606 of an example method to search a relink location for absent data items. At block 702, in an example embodiment, a search string is constructed for a first absent data item. The first absent data item may be any of the absent data items associated with the reference document. In an example, the search string is the filename and extension of an absent data item. For example, with reference to FIG. 2, example entry 214 has a filename of "File2" and an extension of "jpg." The filename and extension may be concatenated with a period in between to form a search string of "File2.jpg." In some example embodiments this search string has the same value as that show in a user interface such as 107 (e.g., data item 302 in FIG. 3). Different operating system may store files differently and the application server may construct a search string that reflects the convention on whatever operating system the application server is running.

At block 704, in an example embodiment, the relink location is searched for the search string. There may be many ways in which to search the relink location. In one example embodiment, a list of data items in the relink may be constructed that matches the form of the search string. For example, with reference to 508, the list may contain one or more entries such as "File1.Tiff," File2.Tiff" . . . "File7.Gif." In this manner the application server may save time by not iterating through the relink location for each absent data item. This list may be compared against the search string.

At block 706, in an example embodiment, it is determined based on searching the relink location for the search string whether a match exists. The searching may be considered to have found a match if the search string has the same value as an entry on the constructed list. If no list was constructed a match may exists when the search string matches an absent data item found in the relink location by other means.

At block 708, in an example embodiment, it is determined a match exists and the data item location is updated for the first absent data item. For example, the first absent data item may be updated with a data item location for the match. As described above with reference to block 608, the first absent data item may be updated to its corresponding entry in the data item library for the referencing document. In this manner, in an example embodiment the data item location is updated for the first absent data item by updating the data item library for the referencing document. In an example embodiment, a flag is removed for the first absent data item indicating the first absent data item was absent. In an example embodiment, information is transmitted to a user device indicating how many of the absent data items have been matched. This information may be presented to the user in the form or a dialog or message box or other means. Similarly, the application server may present to the user the number of data items that are still flagged as absent.

Relinking Data Items with Replacement Data Items

Figure 8:
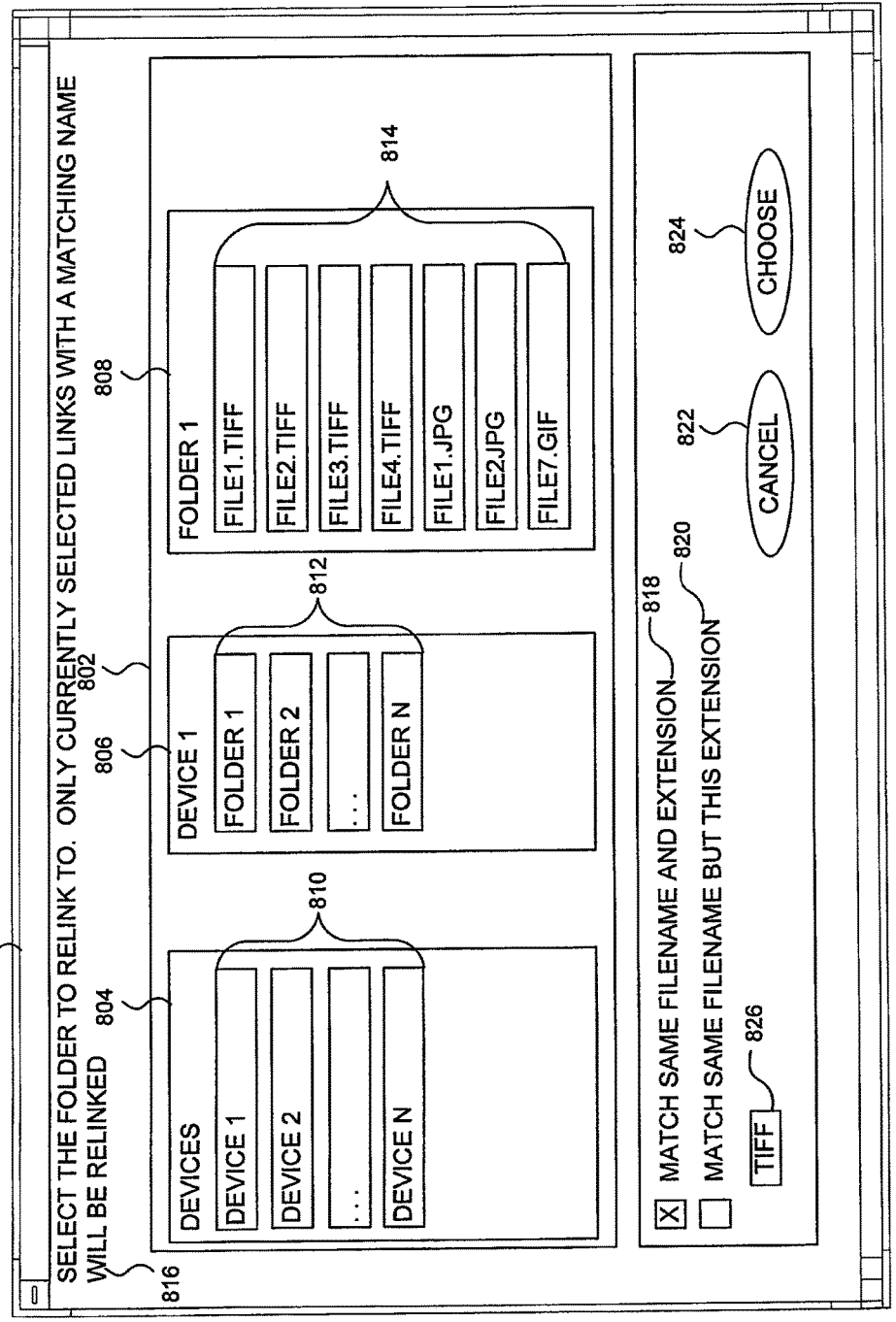
FIG. 8 illustrates an example user interface used to relink data items with replacement data items according to an example embodiment.

FIG. 8 illustrates an example user interface 800 that may be used to relink data items with replacement data items. The interface 800 includes a navigation interface 802 which may include three panels 804, 806, and 808 that reflect devices, folders, and files respectively. In an example embodiment, the devices panel 804 may reflect example storage devices 810 accessible from the application server 109. The devices 810 may be either local or remote storage devices. For example, a local storage devices may include, but are not limited to, a hard drive or a Universal Serial Bus (USB) attached thumb drive. Remote storage devices may include, but are not limited to, a network attached storage (NAS) device, a File Transfer Protocol (FTP) Server, or a storage device located on the Internet. The folder panel 806 displays one or more example folders 812 on "device 1." The files panel display may display example files 814.

The user interface 800 may also include example instructions 816 for a user. In this case, the instructions 816 tell the user to "Select the folder to relink to. Only currently selected links with a matching name will be relinked." The user interface 800 may further include two user preference boxes, 818, 820, a cancel control 822, and a choose control 824. The user preference box 818 may indicate the user wishes to match to the same filename and extension as the selected data item. The user preference box 820 may indicate the user wishes to match the same filename, but use a different extension. In an example embodiment, the replacement extension may be specified in box 826. Choose control 824 may indicate the user wishes to select a folder as the relink location. Cancel control 822 may indicate the user does not wish to relink any data items.

Figure 9:
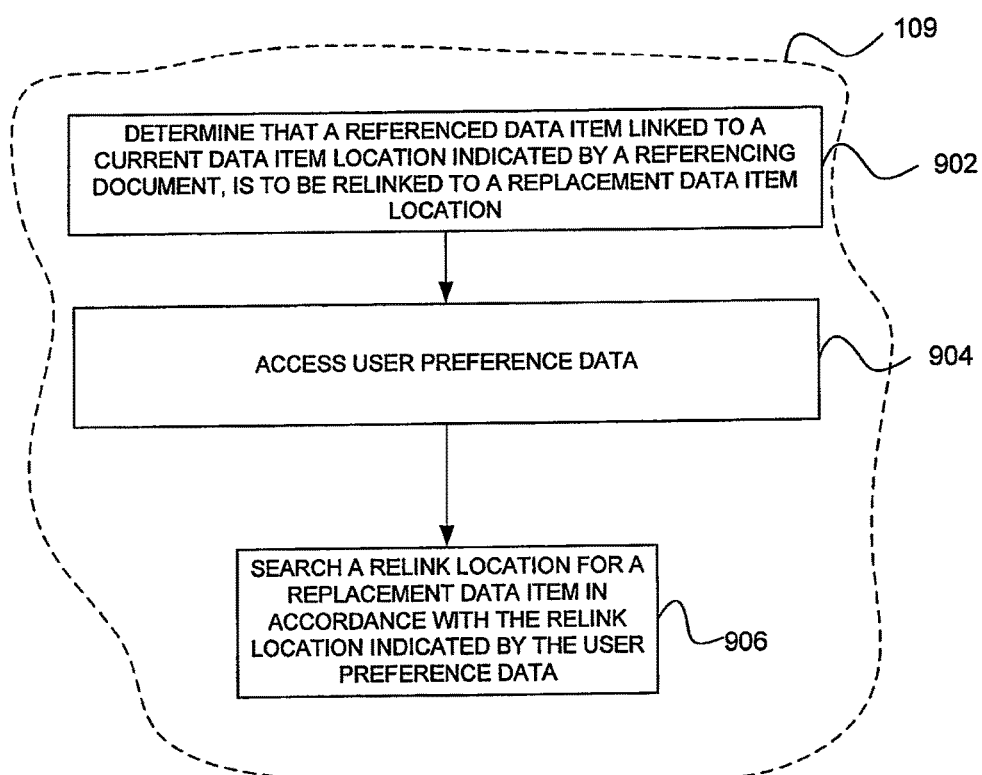
FIG. 9 illustrates an example flowchart to relink a data item with a replacement data item according to an example embodiment.

FIG. 9 illustrates a flowchart 900 of an example method to relink a referenced data item with a replacement data item. At block 902, in an example embodiment, it is determined that a referenced data item linked to a current data item location indicated by a referencing document, is to be relinked to a replacement data item location. In an example, as described above, a user may wish to replace a data item with a new version of the data item. This may be done, for example, by selecting an example data item 302 in a user interface, (e.g., user interface 107 with reference to FIG. 3) and indicating (e.g., through a contextual menu) a preference to relink the data item to a replacement data item. In other example embodiments, multiple data items may be selected.

At block 904, in an example embodiment, user preference data is accessed. The user preference data may indicate a user preference to search a relink location for a replacement data item. For example, a user may use a user interface such as user interface 800 to navigate to a relink location (e.g., the location of the replacement data item). The user preference data may further include a user preference to search the relink location for the same filename and extension as the selected data item or search the relink location for the same filename, but a different replacement extension. The user preference data may also indicate the replacement extension.

In an example embodiment, it is determined whether the user preference data indicates the user preference to search the relink location. A user may activate the choose control (e.g., 824) to indicate that the currently navigated to location is the location in which the user wishes to search for the replacement data item. A user may activate the cancel control (e.g., 822) to indicate the user does not wish to relink any data items. If the user activates the cancel control, the user is presented a user interface (e.g., user interface 107 with reference to FIG. 3) that maintains the selections of data items that the user had selected previously.

At block 906, in an example embodiment, a relink location is searched for a replacement data item in accordance with the relink location indicated by the user preference data. In an example embodiment, the application server may iterate through the data items in the relink location and see if the replacement data item is present. A more detailed example embodiment of searching is described with reference to FIG. 10.

Figure 10:
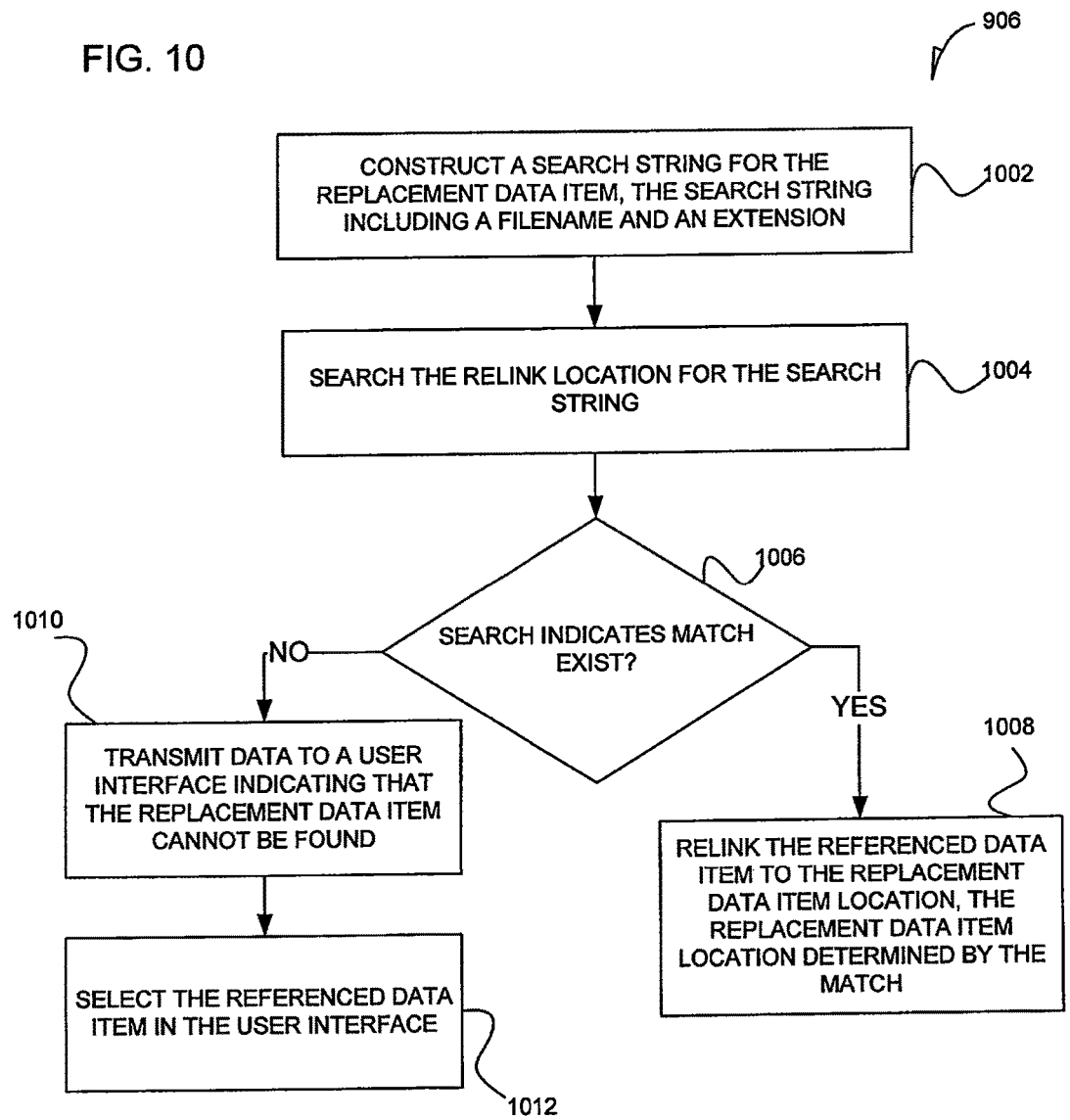
FIG. 10 illustrates an example flowchart to search a relink location for a replacement data item according to an example embodiment.

FIG. 10 illustrates a flowchart 906 of an example method to search a relink location for a replacement data item. At block 1002, in an example embodiment a search string for the replacement data item is constructed, the search string including a filename and an extension. In an example embodiment, the filename of the search string is determined using the referenced data item, the referenced data item having an associated filename. In an example embodiment, the extension is determined in accordance with the user preference data, the user preference data indicating a preference for a replacement extension. Depending on the user preference data, two different search strings may be constructed. For instance, if the user preference data indicates to use the same filename and extension as the selected data item, then the search string may be constructed much as described in block 702. That is, the filename and extension attributes for the entry in the data item library for the reference document may be retrieved and concatenated to form the search string. However, if the user preference data indicates to use a replacement extension, the search string may be constructed from the filename attribute and the specified replacement extension. For example, if the selected data item has a filename of "File 1" and the replacement extension is "tiff" the search string may be "File 1.tiff." In example embodiments where multiple data items have been selected for replacement, multiple search strings may be constructed.

At block 1004, in an example embodiment, the relink location is searched for the search string. There may be many ways in which to search the relink location. In one example embodiment, a list of data items in the relink may be constructed that matches the form of the search string. For example, with reference to example data items 814 in FIG. 8, the list may contain one or more entries such as "File1.Tiff," File2.Tiff" . . . "File7.Gif." Each entry in the list may be compared against the search string. In the case of multiple data items being replaced, the application server may iterate through each constructed search string and compare them against the list.

At block 1006, it is determined whether or not a match has been found based on searching the relink location for the search string. The searching may be considered to have found a match if the search string has the same value as an entry on the constructed list. If no list was constructed, a match may exists when the search string matches a data item found in the relink location found by other means.

At block 1008, in an example embodiment, the searching indicates a match exists and the referenced data item is relinked to the replacement data item location, the replacement data item location determined by the match. In an example embodiment, the current data item location is based on a data item library for the referencing document, the data item library including a list of data items associated with current data item location. Similarly to updating the link location for an absent item, the application server may select the entry in the data library for the referenced data item and may edit the location attribute to reflect the location associated with the match. In an example embodiment, if the user had indicated a new extension, the extension attribute may also be updated. For example, before the user requests a replacement data item, an entry may appear as "File1, jpg, C:\oldlocation\File1.jpg, not missing." The updated entry may look like "File1, tiff, C:\newlocation\File1.tiff, not missing."

At block 1010, in an example embodiment, it is determined that no match has been found in the relink location and data is transmitted to a user interface that the match cannot be found. In some example embodiments, the application may server may not find any matches associated with one or more selected data items. It may be beneficial for the use to know which of the selected files were not found as to allow the user to suggest a new location.

At block 1012, in an example embodiment, the referenced data item is selected in the user interface. In some user's workflows the user may wish to replace many data items, but the data items may be in many locations. For example, with reference to FIG. 3, the user has selected three data items 302, 304, and 310. The application server may then proceed through the flowchart as illustrated in FIG. 9. In this example, the application server has found matches for data items 302 and 304, but not 310. Therefore, data item 310 may still be selected as shown in FIG. 4 (represented by data item 410). The user may then indicate (e.g., through a contextual menu) that he or she wishes to replace the selected data item. In this manner a user may quickly replace a plurality of data items.

A Three-Tier Architecture

In some embodiments, a method is illustrated as implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier, and/or to a backend or storage tier. These logical/mathematical manipulations may relate to certain business rules or processes that govern the software application as a whole. A third, storage tier, may be a persistent storage medium or non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer to peer, or so some other suitable configuration. Further, these three tiers may be distributed between more than one computer system as various software components.

Component Design

Some example embodiments may include the above-illustrated tiers, and their processes or operations, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various APIs, and then compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques and can be written in the same programming language or different programming languages. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Some embodiments may utilize the Open Systems Interconnection (OSI) model, or the Transmission Control Protocol/internet Protocol (TCP/IP) protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, LAN, WAN, or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

A Computer System

FIG. 11 shows a diagrammatic representation of a machine in the example form of a computer system 1100 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The machine may be a Personal Computer (PC), a tablet PC, a Set-Top Box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which are linked (e.g., either by hardwired, wireless, or a combination of hardwired and wireless connections) through a network both perform tasks. In a distributed system environment, program modules may be located in both local and remote memory-storage devices (see below).

The example computer system 1100 includes a processor 1102 (e.g., a Central Processing Unit (CPU), a Graphics Processing Unit (GPU) or both), a main memory 1104 and a static memory 1106, which communicate with each other via a bus 1108. The computer system 1100 may further include a video display unit 1110 (e.g., a Liquid Crystal Display (LCD) or a Cathode Ray Tube (CRT)). The computer system 1100 may also includes an alphanumeric input device 1 mk (e.g., a keyboard), a User Interface (UI) cursor controller (e.g., a mouse), a disc drive unit 1116, a signal generation device 1118 (e.g., a speaker) and a network interface device (e.g., a transmitter) 1120.

The disc drive unit 1116 includes a machine-readable medium 1122 on which is stored one or more sets of instructions 1124 and data structures (e.g., software) embodying or utilized by any one or more of the methodologies or functions illustrated herein. The machine-readable medium may be a computer-readable medium. The software may also reside, completely or at least partially, within the main memory 1104 and/or within the processor 1102 during execution thereof by the computer system 1100, the main memory 1104 and the processor 1102 also constituting machine-readable media.

The instructions 1124 may further be transmitted or received over a network (e.g., the INTERNET) 1126 via the network interface device 1120 utilizing any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventors also contemplate examples in which only those elements shown and described are provided.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A computer-implemented method comprising:
   accessing a data item library including a list of data items referenced by a referencing document, the data item library indicating a data item location for each data item of the list of data items, the data item library being maintained independently of the referencing document, and the referencing document being associated with user preference data, wherein the referencing document is associated and for use with a page layout application;
   identifying whether each data item of a plurality of data items from the list of data items is absent from the data item location indicated by the data item library;
   responsive to the identifying, updating the data item library for the referencing document to reflect an absence of a particular data item of the plurality of data items;
   responsive to the data item library reflecting the absence of the particular data item from the data item location, presenting a user interface that allows a user to provide a selection of a new data item location to relink the particular data item to the new data item location; and
   receiving from the user the new data item location supplied by the user in the user interface;

in response to receiving the selection of the new data item location:
  automatically generating a re-link search for at least one additional particular data item based on the data item library indicating the absence of the at least one additional particular data item, the user preference data being accessed to determine whether a user interface (UI) toggle setting is in a first state, the first state being selected by the user and instructing the generating of the re-link search to determine a re-link location folder from the selected new data item location and to construct the re-link search to search the determined re-link location folder for the at least one additional particular data item, wherein a second state of the UI toggle setting sets a location in the data item library as the new data item location based on the selection of the new data item location and an instruction to not perform the re-link search;
  automatically performing the re-link search for the at least one additional particular data item based on the UI toggle setting being in the first state: and
  updating the data item library for the referencing document based on results of the re-link search.

2. The method of claim 1, wherein the re-link search is generated by constructing a search string for a first absent data item of the at least one additional particular data item, the search string including a filename of the first absent data item, and the performing of the re-link search comprises:
  searching the re-link location folder for the first absent data item having a filename matching the search string; and
  upon determining that a data item having a filename matching the search string exists at the re-link location folder, updating the data item library for the referencing document to specify a location of the data item as the data item location of the first absent data item.

3. The method of claim 2, further comprising based on the selection of the new data item location, updating the data item library for the referencing document by removing a flag for the first absent data item to indicate that the first data item is no longer an absent data item.

4. The method of claim 3, further including:
  subsequent to and based on the updating of the data item library, transmitting information to a user device indicating that absent data items were found in the re-link location folder.

5. The method of claim 1, wherein the user interface (UI) toggle setting is a checkbox displayed within the user interface during the selection of the new data item location.

6. The method of claim 1, wherein the user preference data is stored as a value in the referencing document and the selection by the user of the first state of the UI toggle setting updates the value.

7. The method of claim 1, further comprising:
  displaying the plurality of data items, the displaying allowing the user to make a selection of the at least one additional particular data item as a subset of the plurality of data items; and receiving the selection from the user of the subset of the plurality of data items, wherein the re-link search is for the subset based on the selection of the subset.

8. The method of claim 1, wherein the performing of the re-link search is responsive to the user selecting an open control graphical interface element in the user interface that opens the particular data item at the new data item location in the page layout application.

9. A system comprising:
a processor; and
a re-linking module, coupled to the processor, and configured to:
access a data item library including a list of data items referenced by a referencing document, the data item library indicating a data item location for each data item of the list of data items, the data item library being maintained independently of the referencing document, and the referencing document being associated with user preference data, wherein the referencing document is associated and for use with a page layout application;
identify whether each data item of a plurality of data items from the list of data items is absent from the data item location as indicated by the data item library;
update the data item library for the referencing document to reflect an absence of a particular data item of the plurality of data items;
respond to the data item library reflecting the absence of the particular data item of the plurality of data items by presenting a user interface that allows a user to provide a selection of a new data item location to relink the particular data item to the new data item location; and
in response to receiving the selection of the new data item location supplied by the user in the user interface:
  automatically generate a re-link search for at least one additional particular data item based on the data item library indicating the absence of the at least one additional particular data item, the user preference data being accessed to determine whether a user interface (UI) toggle setting is in a first state, the first state being selected by the user and instructing the re-link search to determine a re-link location folder from the selected new data item location and to construct the re-link search to search the determined re-link location folder for the at least one additional particular data item, wherein a second state of the UI toggle setting sets a location in the data item library as the new data item location based on the selection of the new data item location and an instruction to not perform the re-link search;
  automatically perform the re-link search for the at least one additional particular data item based on the UI toggle setting being in the first state: and
  updating the data item library for the referencing document based on results of the re-link search.

10. The system of claim 9, wherein the user interface is a navigation interface and the selection includes the user navigating through a file system in the navigation interface to the new data item location to select the new data item location, and wherein the UI toggle is displayed in the navigation interface with the file system.

11. The system of claim 9, wherein the re-linking module is further configured to display the plurality of data items, the plurality of data items being individually selectable by the user in the display, and wherein the re-link search is for a subset of the plurality of data items based on the subset being individually selected by the user in the display and unselected ones of the plurality of data items in the display are excluded from the re-link search.

12. A non-transitory machine-readable medium having instructions that, when executed by a processor, implement operations comprising:
  accessing a data item library including a list of data items referenced by a referencing document, the data item library indicating a data item location for each data item of the list of data items, the data item library being maintained independently of the referencing document, and the referencing document being associated with user preference data, wherein the referencing document is associated and for use with a page layout application;
identifying whether each data item of a plurality of data items from the list of data items is absent from the data item location indicated by the data item library;
responsive to the identifying, updating the data item library for the referencing document to reflect an absence of a particular data item of the plurality of data items;
responsive to the data item library reflecting the absence of the particular data item from the data item location, presenting a user interface that allows a user to provide a selection of a new data item location to relink the particular data item to the new data item location; and
in response to receiving the selection of the new data item location supplied by the user in the user interface:
automatically generating a re-link search for at least one additional particular data item based on the data item library indicating the absence of the at least one additional particular data item, the user preference data being accessed to determine whether a user interface (UI) toggle setting is in a first state, the first state being selected by the user and instructing the generating of the re-link search to determine a re-link location folder from the selected new data item location and to construct the re-link search to search the determined re-link location folder for the at least one additional particular data item, wherein a second state of the UI toggle setting sets a location in the data item library as the new data item location based on the selection of the new data item location and an instruction to not perform the re-link search; and
automatically performing the re-link search for the at least one additional particular data item based on the UI toggle setting being in the first state; and
updating the data item library for the referencing document based on results of the re-link search.

13. A computer-implemented method comprising:
determining that a referenced data item, linked to a current data item location as indicated by a data item location entry in a data item library, is to be re-linked to a replacement data item location, the referenced data item having a filename and an associated extension, the data item library including a list of data items referenced by a referencing document and including a data item location entry for each data item of the list of data items, the referencing document being associated with user preference data, wherein the referencing document is associated and for use with a page layout application;
responsive to the determining, presenting a user interface that allows a user to indicate a new data item location for the referenced data item;
receiving from the user a selection of the new data item location in the user interface; and
in response to the selection of the new data item location:
automatically generating a re-link search for at least one additional particular data item from the list of data items based on the selected new data item location, the user preference data being accessed to determine whether a user interface (UI) toggle setting is in a first state, the first state being selected by the user and instructing the generating of the re-link search to determine a re-link location from the selected new data item location and to construct the re-link search to search the determined re-link location for the at least one additional particular data item, wherein the re-link search is generated by constructing a search string for use in searching for the at least one additional particular data item, the search string including a filename and an extension of the filename, the extension of the search string being different from the extension associated with the particular data item;
based on determining that the UI toggle setting is in the first state, automatically performing the re-link search, wherein the re-link search is for one or more different data items to replace with one or more data items in the list of data items when it is determined a replacement data item of the one or more different data items has a filename that matches the filename of a corresponding data item of the one or more data items; and
for each of the one or more data items, upon determining the filename that matches the filename of a corresponding data item exists in the re-link location, updating the corresponding data item location entry in the data item library to indicate the re-link location as the data item location for the corresponding data item, the data item library maintained independently of the referencing document.

14. The method of claim 13, wherein performing of the re-link search comprises executing the search string.

15. The method of claim 14, wherein the extension is based on a state of a UI preference box indicating the user wishes to match the filename of the referenced data item but use a different extension than the extension associated with the referenced data item.

16. The method of claim 14, further including:
determining, using the re-link search, that a particular replacement data item is not found in the re-link location and transmitting data to the user interface indicating that the particular replacement data item cannot be found.

17. The method of claim 13, wherein the re-link search is performed based on the UI toggle setting being in the first state.

18. The method of claim 13, wherein the re-link location is a folder.

19. A non-transitory machine-readable medium having instructions that, when executed by a processor, implement operations comprising:
determining that a referenced data item, linked to a current data item location as indicated by a data item location entry in a data item library, is to be re-linked to a replacement data item location, the referenced data item having a filename and an associated extension, the data item library including a list of data items referenced by a referencing document and including a data item location entry for each data item of the list of data items, the referencing document being associated with user preference data, wherein the referencing document is associated and for use with a page layout application;
responsive to the determining, presenting a user interface that allows a user to indicate a new data item location for the referenced data item;
receiving from the user a selection of the new data item location in the user interface; and
in response to the selection of the new data item location:
automatically generating a re-link search for at least one additional particular data item from the list of data items based on a selected new data item location, the user preference data being accessed to determine whether a user interface (UI) toggle setting is in a first state, the first state being selected by the user and instructing the generating of the re-link search to determine a re-link location from the selected new data item location and to construct the re-link search to search the determined re-link location for the at least one additional particular data item, wherein the re-link search is generated by constructing a search string for use in searching for the at least one additional particular data item, the search string including a filename and an extension, the extension of the search string being different from the extension associated with the particular data item;

based on determining that the UI toggle setting is in the first state, automatically performing the re-link search, wherein the re-link search is for one or more different data items to replace with one or more data items in the list of data items when it is determined a replacement data item of the one or more different data items has a filename that matches the filename of a corresponding data item of the one or more data items; and for each of the one or more data items, upon determining the filename that matches the filename of a corresponding data item exists in the re-link location, updating the corresponding data item location entry in the data item library to indicate the re-link location as the data item location for the corresponding data item, the data item library maintained independently of the referencing document.

* * * * *